(12) United States Patent
Kim

(10) Patent No.: US 8,045,089 B2
(45) Date of Patent: Oct. 25, 2011

(54) LIQUID CRYSTAL DISPLAY

(75) Inventor: Chang Il Kim, Gyeongsangbuk-Do (KR)

(73) Assignee: LG Display Co., Ltd. (KR)

( * ) Notice: Subject to any disclaimer, the term of this patent is extended or adjusted under 35 U.S.C. 154(b) by 179 days.

(21) Appl. No.: 12/318,529

(22) Filed: Dec. 30, 2008

(65) Prior Publication Data

US 2009/0237584 A1    Sep. 24, 2009

(30) Foreign Application Priority Data

Mar. 19, 2008 (KR) .......................... 10-2008-0025574

(51) Int. Cl.
G02F 1/1333 (2006.01)
(52) U.S. Cl. ............................... 349/58; 349/62; 349/65
(58) Field of Classification Search ................... 349/58, 349/62, 65
See application file for complete search history.

(56) References Cited

U.S. PATENT DOCUMENTS

| | | |
|---|---|---|
| 2003/0043314 A1 | 3/2003 | Lee et al. |
| 2005/0073621 A1* | 4/2005 | Lee et al. ........................ 349/53 |
| 2008/0174730 A1 | 7/2008 | Lee et al. |

FOREIGN PATENT DOCUMENTS

CN           1407380           4/2003

* cited by examiner

*Primary Examiner* — Phu Vu
(74) *Attorney, Agent, or Firm* — Morgan, Lewis & Bockius LLP

(57) ABSTRACT

A liquid crystal display includes: a liquid crystal panel; a light source disposed at a lower portion of the liquid crystal panel and providing light to the liquid crystal panel; a light guide plate for guiding light emitted from the light source toward the liquid crystal panel; and a lower cover including a plurality of guide protrusions being in contact with the side of the light guide plate to guide the position of the light guide plate and accommodating the light source and the light guide plate therein.

4 Claims, 5 Drawing Sheets

LIQUID CRYSTAL DISPLAY

This invention claims the benefit of Korean Patent Application No. 10-2008-0025574 filed in Korea on Mar. 19, 2008, which is hereby incorporated by reference in its entirety.

BACKGROUND OF THE INVENTION

1. Field of the Invention

The present invention relates to a liquid crystal display and, more particularly, to a liquid crystal display in which a light guide plate is precisely disposed at a desired position within a lower cover to prevent an erroneous assembling of a main support due to a movement of the light guide plate or to prevent damage of a lamp due to the movement of the light guide plate.

2. Description of the Related Art

In general, currently, an application coverage of a liquid crystal display (LCD) extends thanks to its characteristics that it is lighter, thinner, and driven at a low power consumption. Thus, the LCDs are commonly used as mobile electronic devices such as notebook computers, mobile phones, or the like.

The LCD displays a desired image on its screen by controlling the amount of transmission of light according to a video signal applied to a plurality of controlling switching elements arranged in a matrix form.

The LCD includes a liquid crystal panel including a color filter substrate, an upper substrate, and a thin film transistor (TFT) substrate, a lower substrate, and a liquid crystal layer filled therebetween, and a driver that supplies a scan signal and image information to the liquid crystal panel to operate the liquid crystal panel.

The LCD is not a self-emissive display device which does not emit light by itself, so it requires a light source for providing light to the liquid crystal panel. Thus, the LCD includes a backlight assembly including a light source to supply light to the liquid crystal panel, and a light guide plate and an optical sheet to convert light emitted from the light source into white uniform plane light.

A light source for generating light in the backlight assembly includes a CCFL (Cold Cathode Fluorescent lamp), an EEFL (External Electrode Fluorescent Lamp), the LED, or the like.

The general LCD will now be described with reference to the accompanying drawings. As shown in FIG. 1, the general LCD includes a liquid crystal panel 1, a backlight assembly providing light to the liquid crystal panel 1, a lower cover 4 for accommodating the backlight assembly, and a main support 7 disposed on the lower cover 4 and receiving the liquid crystal panel 1 therein. The backlight assembly includes lamps 2 disposed at both sides within the lower cover 4, a lamp housing 5 for accommodating the lamp 2 therein to protect it, a light guide plate 3 for guiding light emitted from the lamp 2 toward the liquid crystal panel 1, and an optical sheet 6 for converting light emitting from the lamp 2 and supplying the same to the liquid crystal panel 1. With reference to FIG. 1, the main support 7 is configured to have the interior which is open up and down and covers the side of the liquid crystal panel 1. The main support 7 includes a plurality of protrusions 7a protruded in an inward direction at its inner side, and the light guide plate 3 includes recesses 3a corresponding to the protrusions 7a.

In assembling the LCD, the light guide plate 3 is disposed at a substantial position at an inner side of the lower cover 4, the lamp 2 and the lamp housing 5 are disposed to correspond to the side of the edges of the lower cover 4, namely, at the side of the light guide plate 3, and then, the main support 7 is disposed on the lower cover 4. Then, the plurality of protrusions 7a formed on the inner side of the main support 7 and the plurality of recesses 3a of the light guide plate 3 correspond to allow the light guide plate 3 to be plated at its position as designed.

In this respect, however, because the light guide plate 3 is not fixed yet at the inner side of the lower cover 4 until before the main support 7 is disposed on the lower cover 4, the light guide plate 3 may move to cause damage to the lamp 2, or while the main support 7 is being disposed on the lower cover 4, it may not be properly placed on its due position as designed but erroneously assembled due to a movement of the light guide plate 3. In addition, in assembling the LCD, in the process of disposing the light guide plate 3 at the inner side of the lower cover 4, an alignment operation is required to place the light guide plate 3 at the same positioned as designed as exactly as possible, so the assembling operation is not effective.

SUMMARY OF THE INVENTION

Therefore, in order to address the above matters, the various features described herein have been conceived. One aspect of the exemplary embodiments is to provide a liquid crystal display (LCD) capable of not causing an erroneous assembling of a main support due to a movement of a light guide plate by providing a guide unit of the light guide plate required for an assembling process at an inner side of a lower cover to allow the light guide plate to be precisely disposed and fixed at a desired position at the inner side of the lower cover, and capable of preventing a lamp from being damaged due to a movement of the light guide plate.

This specification provides an LCD including: a liquid crystal panel; a light source disposed at a lower portion of the liquid crystal panel and providing light to the liquid crystal panel; a light guide plate for guiding light emitted from the light source toward the liquid crystal panel; and a lower cover including a plurality of guide protrusions being in contact with the side of the light guide plate to guide the position of the light guide plate and accommodating the light source and the light guide plate therein.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

A liquid crystal display (LCD) according to exemplary embodiments of the present invention will now be described with reference to the accompanying drawings.

First Embodiment

Figure 1:
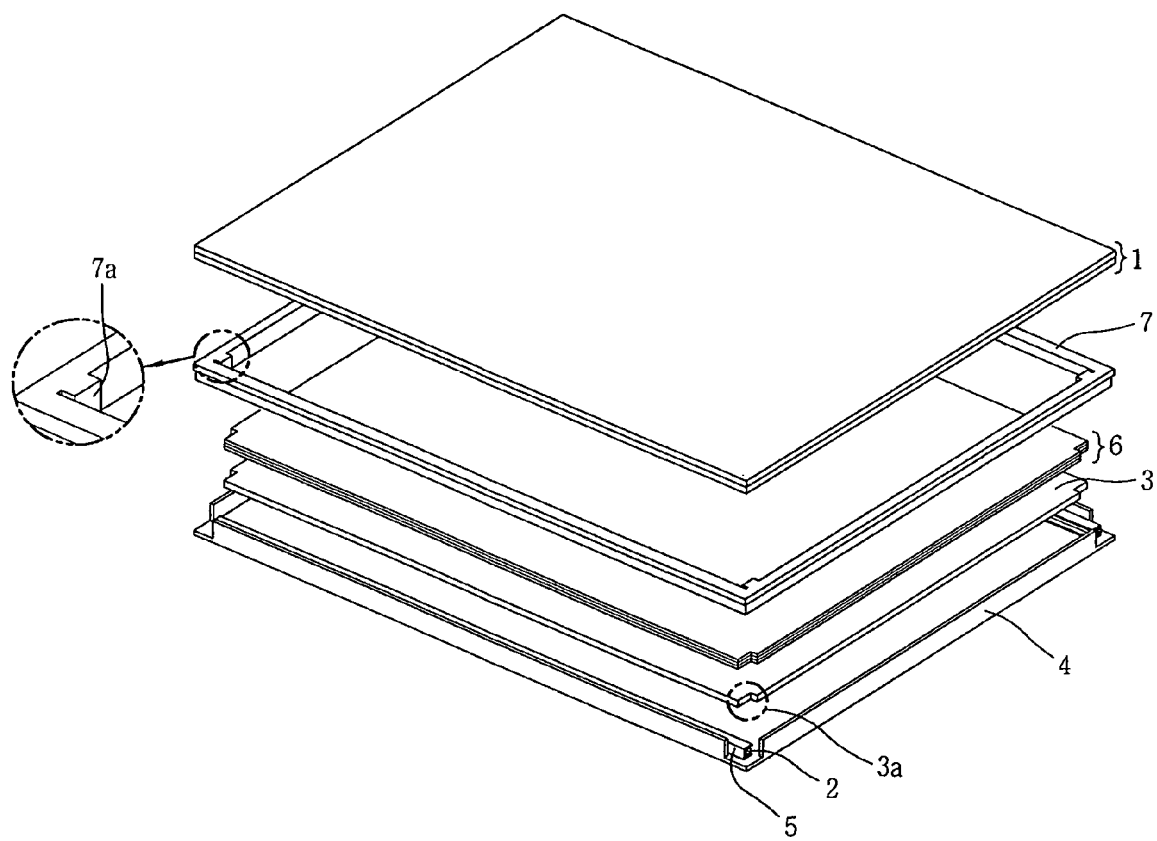
FIG. 1 is an exploded perspective view of a general liquid crystal display (LCD)
Figure 2:
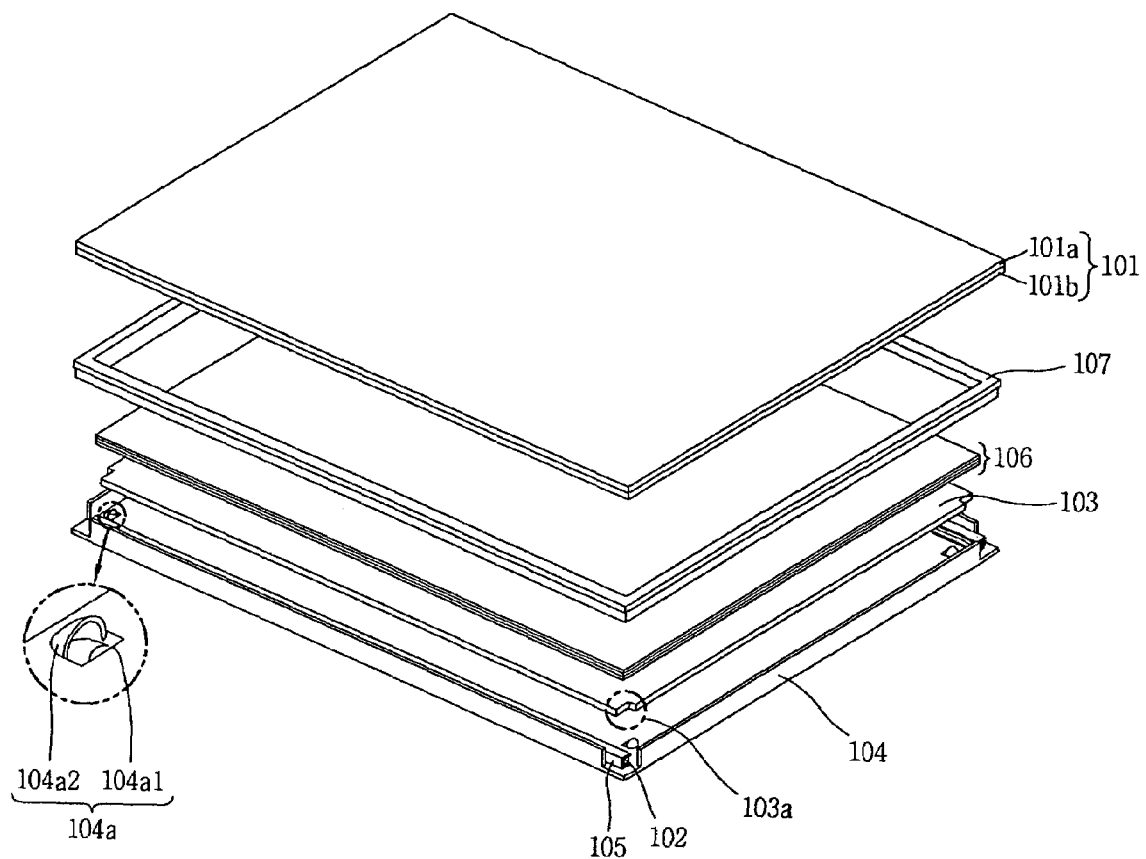
FIG. 2 is an exploded perspective view of an LCD according to a first embodiment of the present invention.

First the LCD according to a first embodiment of the present invention will now be described with reference to FIGS. 2 to 4. As shown in FIG. 2, the LCD according to the first embodiment of the present invention includes a liquid crystal panel 101, a light source 102 disposed at a lower side of the liquid crystal panel 101 and providing light to the liquid crystal panel 101; a light guide plate 103 guiding light emitted from the light source 102 toward the liquid crystal panel 101; and a lower cover 104 including a plurality of guide protrusions 104a being in contact with the side of the light guide plate 103 to guide the position of the light guide plate 103 and accommodating the light source 102 and the light guide plate 103 therein. The guide protrusions 104a includes a hole-shaped cutaway region 104a1 formed by cutting away a portion of the lower cover 104 in a straight line; and a projection region 104a2 being adjacent to the cutaway region 104a1 and projected in an upward direction of the lower cover 104.

Each element of the LCD constructed as described above will now be explained in detail.

With reference to FIG. 2, the liquid crystal panel 101 includes a color filter substrate 101a, an upper substrate, and thin film transistor (TFT) array substrate 101b, a lower substrate. Although not shown, a liquid crystal layer is formed between the two substrates 101a and 101b. A plurality of light sources 102 are provided below the liquid crystal panel 101 to provide light to the liquid crystal panel. As for the LCD according to the first embodiment of the present invention, the light sources 102 are fluorescent lamps, among various types of light sources, but the present invention is not limited thereto, and various other examples such as a light emitting diode or the like may be used as the light sources 102

With reference to FIG. 2, a lamp housing 105 is provided to cover and protect the lamps provided as the light sources 102 providing light to the liquid crystal panel 101. The lamp housing 105 is configured such that a region corresponding to a light receiving surface of the light guide plate 103 is open to thus correspond to the light receiving surface of the light guide plate 103.

With reference to FIG. 2, the light guide plate 103 serves to guide light emitted from the light source 102 toward the light crystal panel 101 and includes a light receiving surface onto which light from the light sources 102 is made incident and a light output surface from which light from the light sources 102 is outputted after being converted into planar light. A guide recess 103a may be formed at a position, which corresponds to the guide projection 104a of the lower cover 104, at the side of the light guide plate 103. It will be described in detail together with the guide protrusions 104a of the lower cover 104.

With reference to FIG. 2, an optical sheet 106 is disposed at an upper portion of the light sources 102 to convert light emitted from the light sources 102 to supply the same to the liquid crystal panel 101. The optical sheet 105 includes a plurality of sheets such as a diffusion sheet, a prism sheet, a protection sheet, or the like. Although not shown, a reflection sheet (not shown) may be provided below the light sources 102 to reflect light from the light sources 102 to make light proceed to the optical sheet 106.

With reference to FIG. 2, the light sources 102, the light guide plate 103, the reflection sheet (not shown) and the optical sheet 106 are disposed at an inner side of the lower cover 104, and the liquid crystal panel 101 is mounted at an inner side or at an upper portion of a main support 107 disposed on the lower cover 104. The lower cover 104 is configured such that its upper region is open while its side and lower regions are closed, and includes a plurality of guide protrusions 104a for guiding the position of the light guide plate 103 by being contacted with the side of the light guide plate 103.

The guide protrusions 104a will now be described with reference to FIGS. 2 to 4.

The guide protrusion 104a includes the cutaway region 104a1 formed as a hole by cutting away a portion of the lower cover 104 in a straight line and a projection region 104a2 being adjacent to the cutaway region 104a1 and formed to be projected in an upward direction of the lower cover 104. The cutaway region 104a1 of the guide protrusion 104a may be a scar penetratingly formed in the straight line from an inner surface to an outer surface of the lower cover 104 or may be a hole formed at a region of the lower cover 104. However, the cutaway region 104a1 of the guide protrusion 104a as shown in FIGS. 2 to 4 are formed to cut away a region of the lower cover 104 in the straight line with a certain width, but the present invention is not limited thereto. That is, the shape and size of the cutaway region 104a1 may vary without departing the scope of the present invention.

The projection region 104a2 of the guide protrusion 104 is formed by applying pressure to an adjacent region of the cutaway region 104a1 in an upward direction of the lower cover 104, and may have various shapes. That is, the projection region 104a2 of the guide protrusion 104 is formed by pushing the adjacent region of the cutaway region 104a1 in the upward direction of the lower cover 104 such that it has a round shape, but without being limited thereto, the projection region 104a2 may have various shapes without departing from the scope of the present invention.

Figure 3:
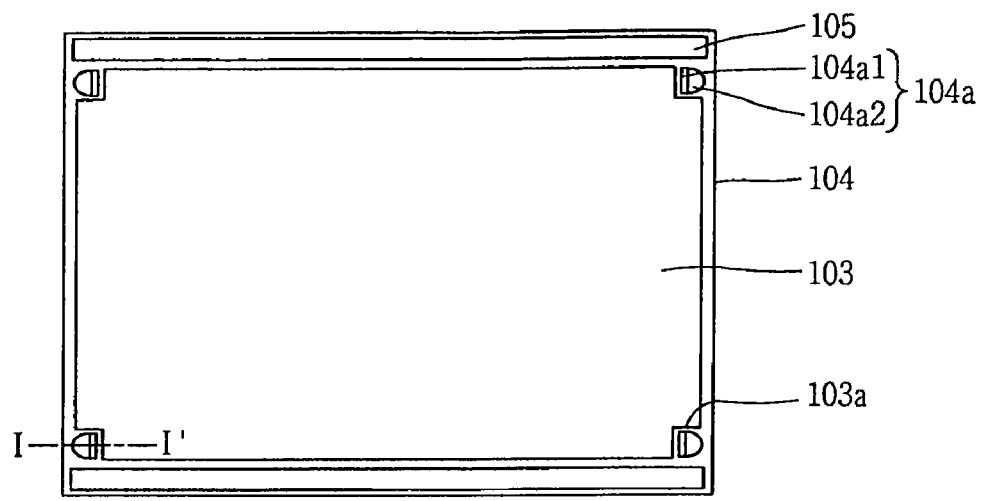
FIG. 3 is a plan view showing an assembled state of a light guide plate, a light source and a lamp housing within a lower cover in FIG. 2.
Figure 4:
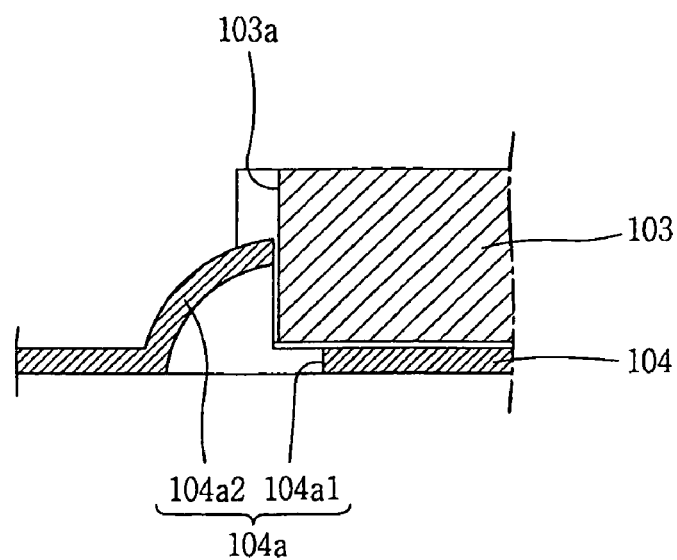
FIG. 4 is a sectional view taken along line I-I' in FIG. 3.

With reference to FIGS. 2 to 4, the guide recess 103a may be formed at the light guide plate 103 at a region corresponding to the guide protrusion 104a1 of the lower cover 104. The guide recess 103a as shown in FIGS. 2 to 4 has a rectangular parallelepiped shape, but the present invention is not limited thereto, and it may have any shape so long as it can serve as a guide unit of the light guide plate 103 by corresponding to the guide protrusion 104a of the lower cover 104.

The guide protrusion 104a of the lower cover 104 and the guide recess 103a of the light guide plate 103 serve as guides to allow the light guide plate 103 to be precisely mounted at a designed position in mounting the light guide plate 103 at the inner side of the lower cover in assembling the LCD, and serve to prevent the light guide plate 103 mounted on the lower cover 104 from being moved within the lower cover 104, to thereby prevent the main support 107 from being erroneously assembly due to a possible movement of the light guide plate 103 or the light sources 102, namely, the lamps, from being damaged, thus improving display quality of the LCD. In addition, because the guide protrusion 104a of the lower cover 104 and the guide recess 103a of the light guide plate 103 guide the position where the light guide plate 103 is to be disposed in the process of mounting the light guide plate 103 at the inner side of the lower cover 104 in assembling the LCD, any additional aligning operation is not required to precisely the light guide plate 103 at the designed position of the inner side of the lower cover 104. Thus, the assembling operation can be effectively performed and the assembling process time can be shortened.

Second Embodiment

An LCD according to a second embodiment of the present invention will now be described with reference to FIGS. 5 and 6.

In describing the LCD according to the second embodiment of the present invention, description for the same elements as those of the LCD according to the first embodiment will be omitted, and the guide protrusion of the lower cover will be described in detail.

Figure 5:
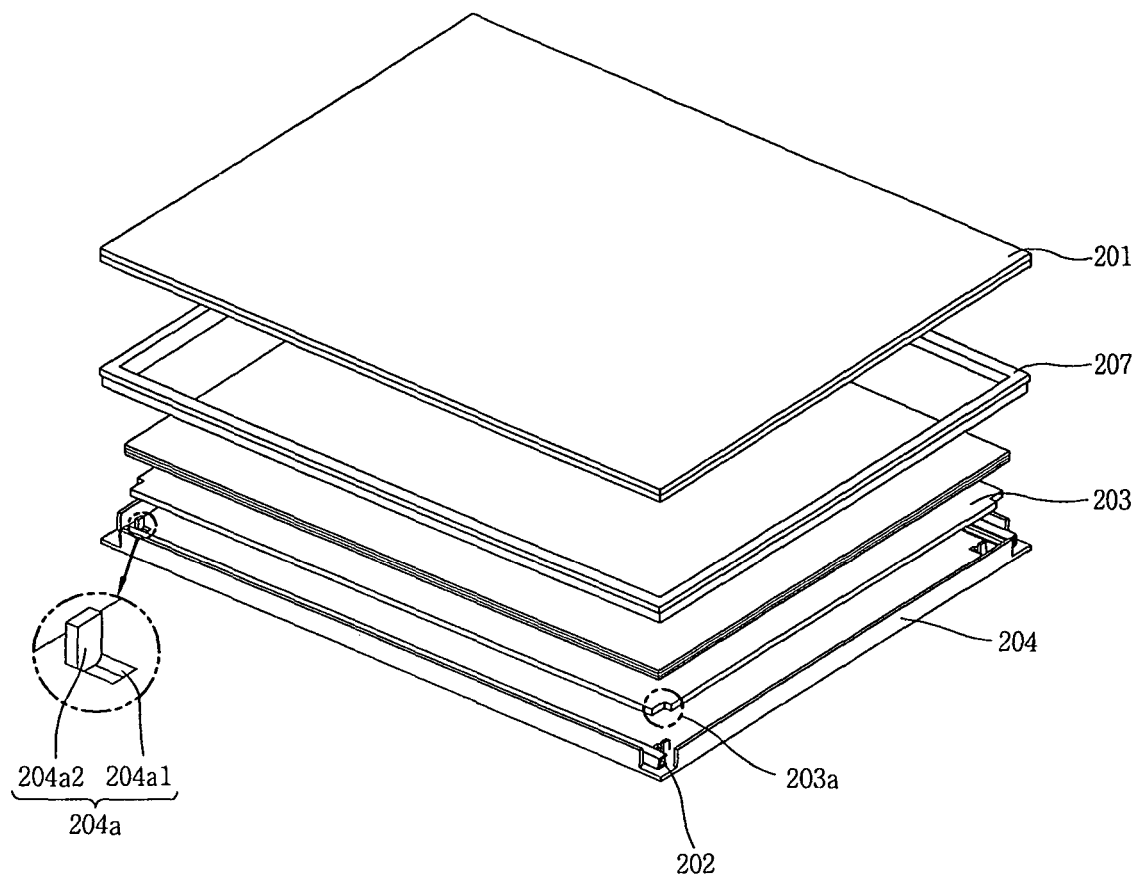
FIG. 5 is an exploded perspective view of the LCD according to a second embodiment of the present invention.

As shown in FIG. 5, the LCD according to the second embodiment of the present invention includes a liquid crystal panel 201; a light source 202 disposed at a lower side of the liquid crystal panel 201 and providing light to the liquid crystal panel 201; a light guide plate 203 guiding light emitted from the light source 202 toward the liquid crystal panel 201; and a lower cover 204 including a plurality of guide protrusions 204a being in contact with the side of the light guide plate 203 to guide the position of the light guide plate 203 and accommodating the light source 202 and the light guide plate 203 therein. The guide protrusion 204a includes a hole-shaped cutaway region 204a1 formed by cutting away a portion of the lower cover 204 in a channel shape and a projection region 204a2 projected in an upward direction of the lower cover 204 and being adjacent to the cutaway region 204a1.

The guide protrusion 204a of the lower cover 204 according to the second embodiment of the present invention will now be described in detail.

Figure 6:
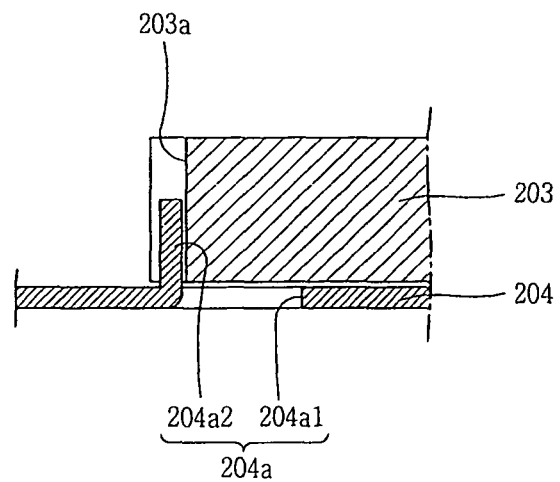
FIG. 6 is a sectional view showing portion of the light guide plate, the light source and the lamp housing disposed at the inner side of the lower cover in FIG. 5.

With reference to FIGS. 5 and 6, the guide protrusion 204a includes the cutaway region 204a1 as a recess formed by cutting away a portion of the lower cover 204 in a channel shape and a projection region 204a2 formed to be projected in the upward direction of the lower cover 204 such that it is adjacent to the cutaway region 204a1. Namely, the guide protrusion 204a1 is configured such that a portion of the lower cover 204 is cut away in the channel shape and lifted in the upward direction of the lower cover 204. The lifted region forms the projection region 204a2 and the remaining hole region forms the cutaway region 204a1.

With reference to FIGS. 5 and 6, a guide recess 203a may be formed at a region corresponding to the guide protrusion 204a of the lower cover 204 at the light guide plate 203.

As shown in FIGS. 5 and 6, the guide recess 203a is rectangular parallelepiped, but the present invention is not limited thereto and the guide recess 203a may have any shape so long as it can serve as a guide unit for guiding the position of the light guide plate 203 by corresponding to the guide protrusion 204a of the lower cover 204.

The guide protrusion 204a of the lower cover 204 and the guide recess 203a of the light guide plate 203 serve as guides to allow the light guide plate 203 to be precisely mounted at a designed position in mounting the light guide plate 203 at the inner side of the lower cover in assembling the LCD, and serve to prevent the light guide plate 203 mounted on the lower cover 204 from being moved within the lower cover 204, to thereby prevent a main support 207 from being erroneously assembly due to a possible movement of the light guide plate 203 or the light sources 202, namely, the lamps, from being damaged. In addition, because the guide protrusion 204a of the lower cover 204 and the guide recess 203a of the light guide plate 203 guide the position where the light guide plate 203 is to be disposed in the process of mounting the light guide plate 203 at the inner side of the lower cover 204 in assembling the LCD, any additional aligning operation is not required to precisely the light guide plate 203 at the designed position of the inner side of the lower cover 204. Thus, the assembling operation can be effectively performed.

Third Embodiment

An LCD according to a third embodiment of the present invention will now be described with reference to FIGS. 7 and 8.

In describing the LCD according to the third embodiment of the present invention, description for the same elements as those of the LCD according to the first embodiment will be omitted, and the guide protrusion of the lower cover will be described in detail.

Figure 7:
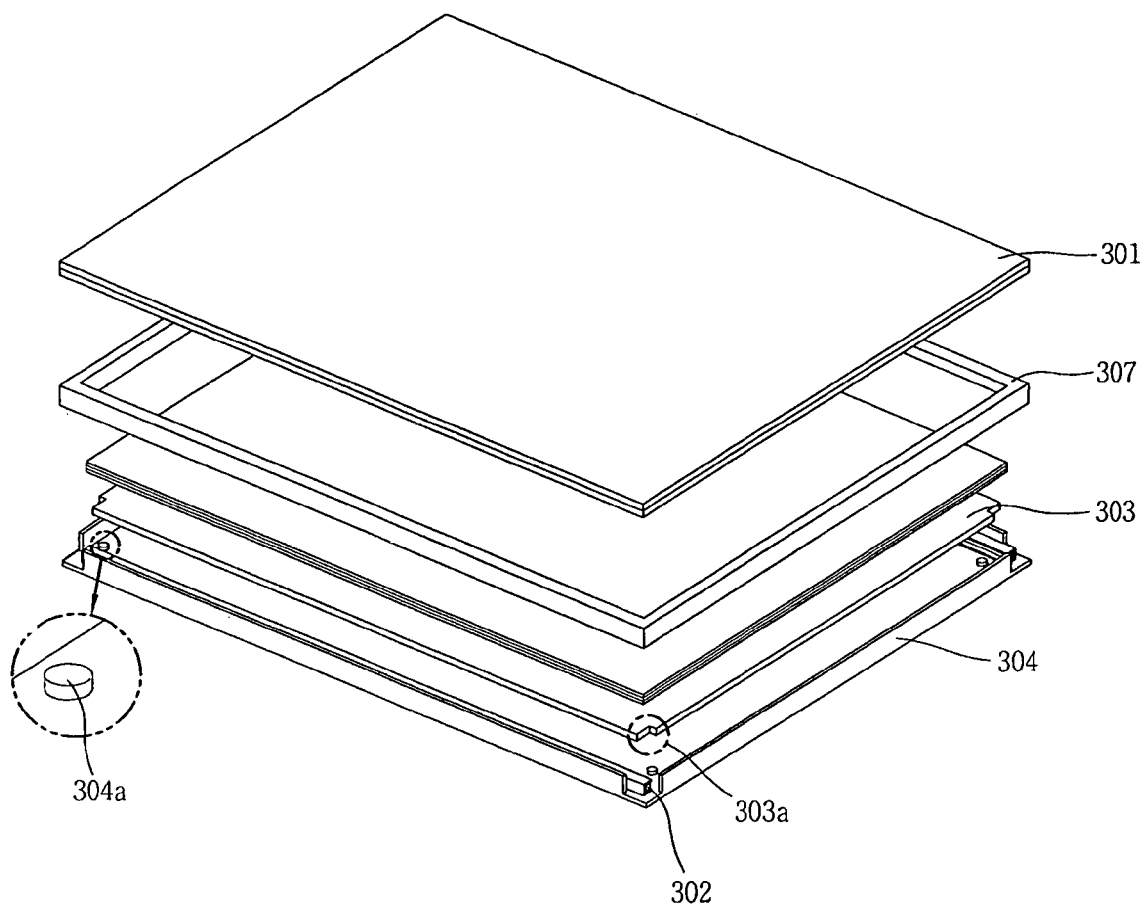
FIG. 7 is an exploded perspective view of an LCD according to a third embodiment of the present invention.

As shown in FIG. 7, the LCD according to the third embodiment of the present invention includes a liquid crystal panel 301; a light source 302 disposed at a lower side of the liquid crystal panel 301 and providing light to the liquid crystal panel 301; a light guide plate 303 guiding light emitted from the light source 302 toward the liquid crystal panel 301; and a lower cover 304 including a plurality of guide protrusions 304a being in contact with the side of the light guide plate 303 to guide the position of the light guide plate 303 and accommodating the light source 302 and the light guide plate 303 therein. The guide protrusion 304a1 is formed by allowing a portion of the lower cover 304 to be protruded in an upward direction of the lower cover 304.

The guide protrusion 304a of the lower cover 304 according to the third embodiment of the present invention will now be described in detail.

Figure 8:
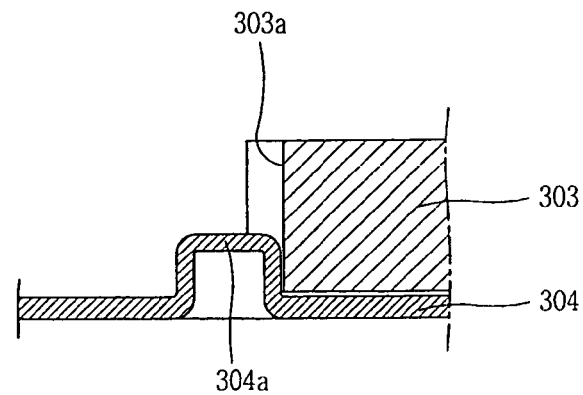
FIG. 8 is a sectional view showing portion of the light guide plate, the light source and the lamp housing disposed at the inner side of the lower cover in FIG. 7.

With reference to FIGS. 7 and 8, the guide protrusion 304a is formed by pressing a portion of the lower cover 304 in the upward direction of the lower cover 304 so as to be formed be protruded to have a cylindrical shape.

The guide protrusion 304a as shown in FIGS. 7 and 8 have the cylindrical shape, but the present invention is not limited thereto, and the guide protrusion 304a may have various other shapes such as a rectangular parallelepiped without departing from the scope of the present invention.

With reference to FIGS. 7 and 8, a guide recess 303a may be formed at a region corresponding to the guide protrusion 304a of the lower cover 304 at the light guide plate 303.

With reference to FIGS. 7 and 8, the guide recess 303a is formed to have a rectangular parallelepiped, but the present invention is not limited thereto, and it can vary without departing from the scope of the present invention so long as it has the same shape as that of the guide protrusion 304a of the lower cover 304 and precisely engaged with the guide protrusion 304a.

The guide protrusion 304a of the lower cover 304 and the guide recess 303a of the light guide plate 303 serve as guides to allow the light guide plate 303 to be precisely mounted at a designed position in mounting the light guide plate 303 at the inner side of the lower cover in assembling the LCD, and serve to prevent the light guide plate 303 mounted on the lower cover 304 from being moved within the lower cover 304, to thereby prevent a main support 307 from being erroneously assembly due to a possible movement of the light guide plate 303 or the light sources 302, namely, the lamps, from being damaged.

In addition, because the guide protrusion 304a of the lower cover 304 and the guide recess 303a of the light guide plate 303 guide the position where the light guide plate 303 is to be disposed in the process of mounting the light guide plate 303 at the inner side of the lower cover 304 in assembling the LCD, any additional aligning operation is not required to precisely the light guide plate 303 at the designed position of the inner side of the lower cover 304. Thus, the assembling operation can be effectively performed.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display device comprising:
   a liquid crystal panel;
   a light source disposed at a lower portion of the liquid crystal panel and providing light to the liquid crystal panel;
   a light guide plate for guiding light emitted from the light source toward the liquid crystal panel; and
   a lower cover including a plurality of guide protrusions being in contact with the side of the light guide plate to guide the position of the light guide plate and accommodating the light source and the light guide plate therein,
   wherein the guide protrusion comprises a cutaway region formed by cutting away a portion of the lower cover and a projection region being adjacent to the cutaway region and projected in an upward direction of the lower cover, and
   wherein the cutaway region of the guide protrusion is implemented as a scar penetratingly formed in the straight line from an inner surface to an outer surface of the lower cover.

2. The device of claim 1, wherein the projection region of the guide protrusion is implemented as a portion of the lower cover is cut away in the channel shape and lifted in the upward direction of the lower cover.

3. The device of claim 1, wherein the guide protrusion is formed by allowing a portion of the lower cover to be projected in the upward direction of the lower cover.

4. The device of claim 1, wherein a guide recess is formed at the side of the light guide plate and contacts with the guide protrusion of the lower cover in a corresponding manner.

* * * * *